/

US009338080B2

(12) United States Patent
Patel et al.

(10) Patent No.: US 9,338,080 B2
(45) Date of Patent: May 10, 2016

(54) PERFORMING OFFLINE BGP PREFIX ORIGIN AND PATH VALIDATION AT ROUTE REFLECTORS

(75) Inventors: Keyur P. Patel, San Jose, CA (US); Burjiz F. Pithawala, San Jose, CA (US); Ed Kern, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 313 days.

(21) Appl. No.: 13/619,683

(22) Filed: Sep. 14, 2012

(65) Prior Publication Data

US 2014/0082216 A1    Mar. 20, 2014

(51) Int. Cl.
*G06F 15/173* (2006.01)
*H04L 12/715* (2013.01)
*H04L 12/751* (2013.01)

(52) U.S. Cl.
CPC ............. *H04L 45/04* (2013.01); *H04L 45/02* (2013.01)

(58) Field of Classification Search
CPC .... H04W 40/248; H04W 40/02; H04L 45/04; H04L 45/28
USPC ........................................................ 709/242
See application file for complete search history.

(56) References Cited

U.S. PATENT DOCUMENTS

| | | | |
|---|---|---|---|
| 6,339,595 B1 | 1/2002 | Rekhter et al. | |
| 6,463,061 B1 | 10/2002 | Rekhter et al. | |
| 6,526,056 B1 | 2/2003 | Rekhter et al. | |
| 7,154,889 B1 | 12/2006 | Rekhter et al. | |
| 7,369,556 B1 | 5/2008 | Rekhter et al. | |
| 7,609,619 B2 | 10/2009 | Naseh et al. | |
| 7,697,439 B2 | 4/2010 | Martini et al. | |
| 7,769,886 B2 | 8/2010 | Naseh et al. | |
| 2006/0174035 A1* | 8/2006 | Tufail | 709/239 |
| 2009/0164835 A1* | 6/2009 | Uttaro | 714/4 |
| 2012/0189009 A1* | 7/2012 | Shekhar et al. | 370/392 |
| 2012/0224506 A1* | 9/2012 | Gredler et al. | 370/254 |
| 2014/0003232 A1* | 1/2014 | Guichard et al. | 370/230 |

OTHER PUBLICATIONS

Lepinski, M., "BGPSEC Protocol Specification", Network Working Group, Internet Draft, draft-ietf-sidr-bgpsec-protocol-03, May 2012, 31 pages, Internet Engineering Task Force Trust.

(Continued)

*Primary Examiner* — David Lazaro
*Assistant Examiner* — Zia Khurshid
(74) *Attorney, Agent, or Firm* — Parker Ibrahim & Berg LLC; James M. Behmke; Stephen D. LeBarron

(57) ABSTRACT

In one embodiment, an edge router receives an update message from a neighboring EBGP edge router, creates a modified origin validation state extended community, prepares a modified update message by attaching the modified origin validation state extended community to the update message, and sends the modified update message to a route reflector. The route reflector receives the modified update message, performs a prefix origin validation and a path validation based on the information contained in the modified update message, prepares a validation message based on the prefix origin validation and path validation, and sends the validation message to the edge router and to all other neighboring IBGP edge routers. The edge routers receive the validation message from the route reflector, parse the validation message, and inherit a validation state parsed from the validation message.

20 Claims, 7 Drawing Sheets

(56) References Cited

OTHER PUBLICATIONS

Mohapatra, et al.., "BGP Prefix Origin Validation State Extended Community", Network Working Group, Internet Draft, draft-ietf-sidr-origin-validation-signalling-01, Aug. 2011, 7 pages, Internet Engineering Task Force Trust.

Mohapatra, et al.., "BGP Prefix Origin Validation", Network Working Group, Internet Draft, draft-ietf-sidr-pfx-validate-03, Oct. 2011, 13 pages, Internet Engineering Task Force Trust.

Rekhter, et al.., "A Border Gateway Protocol 4 (BGP-4)", Network Working Group, Request for Comments 4271, Jan. 2006, 104 pages, The Internet Society.

Sriram, K., "BGPSEC Design Choices and Summary of Supporting Discussions", Network Working Group, Internet Draft, draft-sriram-bgpsec-design-choices-00, Jul. 2011, 42 pages, Internet Engineering Task Force Trust.

Walton, et al., "Advertisement of Multiple Paths in BGP", Network Working Group, Internet Draft, draft-ietf-idr-add-paths-04.txt, Aug. 2010, 8 pages, Internet Engineering Task Force Trust.

* cited by examiner

|   0                 |   1             |   2                     |   3             |
|---------------------|-----------------|-------------------------|-----------------|
| 0 1 2 3 4 5 6 7     | 8 9 0 1 2 3 4 5 | 6 7 8 9 0 1 2 3 4 5     | 6 7 8 9 0 1     |
| 0x43                | TBD             | Reserved                | validationstate |
| Reserved            |                 |                         |                 |

FIG. 4

|   0                 |   1             |   2                     |   3             |
|---------------------|-----------------|-------------------------|-----------------|
| 0 1 2 3 4 5 6 7     | 8 9 0 1 2 3 4 5 | 6 7 8 9 0 1 2 3 4 5     | 6 7 8 9 0 1     |
| 0x43                | TBD             | Type                    | validationstate |
| Value               |                 | Value                   |                 |

PERFORMING OFFLINE BGP PREFIX ORIGIN AND PATH VALIDATION AT ROUTE REFLECTORS

TECHNICAL FIELD

The present disclosure relates generally to computer networks, and, more particularly, to offline BGP prefix origin and path validation in computer networks.

BACKGROUND

Typically, Border Gateway Protocol (BGP) prefix origin and path validation is performed on edge routers having an external BGP (EBGP) peering relationship with a neighboring autonomous system (AS). This requires the edge routers to maintain a lot of security related state to perform the BGP prefix origin and path validation. One alternative mechanism is to perform BGP prefix origin and path validation on route reflectors (RRs), since RRs typically act as a central route database for internal BGP (IBGP) clients. However current BGP mechanisms do not allow RRs to announce the validation state to all IBGP peers.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example origin validation state extended community;
FIG. 5 illustrates an example modified validation state extended community.

DESCRIPTION OF EXAMPLE EMBODIMENTS

Overview

According to one or more embodiments of the disclosure, an edge router receives an update message from a neighboring EBGP edge router, creates a modified origin validation state extended community, prepares a modified update message by attaching the modified origin validation state extended community to the update message, and sends the modified update message to a route reflector. The route reflector receives the modified update message, performs a prefix origin validation and a path validation based on the information contained in the modified update message, prepares a validation message based on the prefix origin validation and path validation, and sends the validation message to the edge router and to all other neighboring IBGP edge routers. The edge routers receive the validation message from the route reflector, parse the validation message, and inherit a validation state parsed from the validation message.

Description

A computer network is a geographically distributed collection of devices/nodes interconnected by communication links and segments for transporting data between end devices/nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
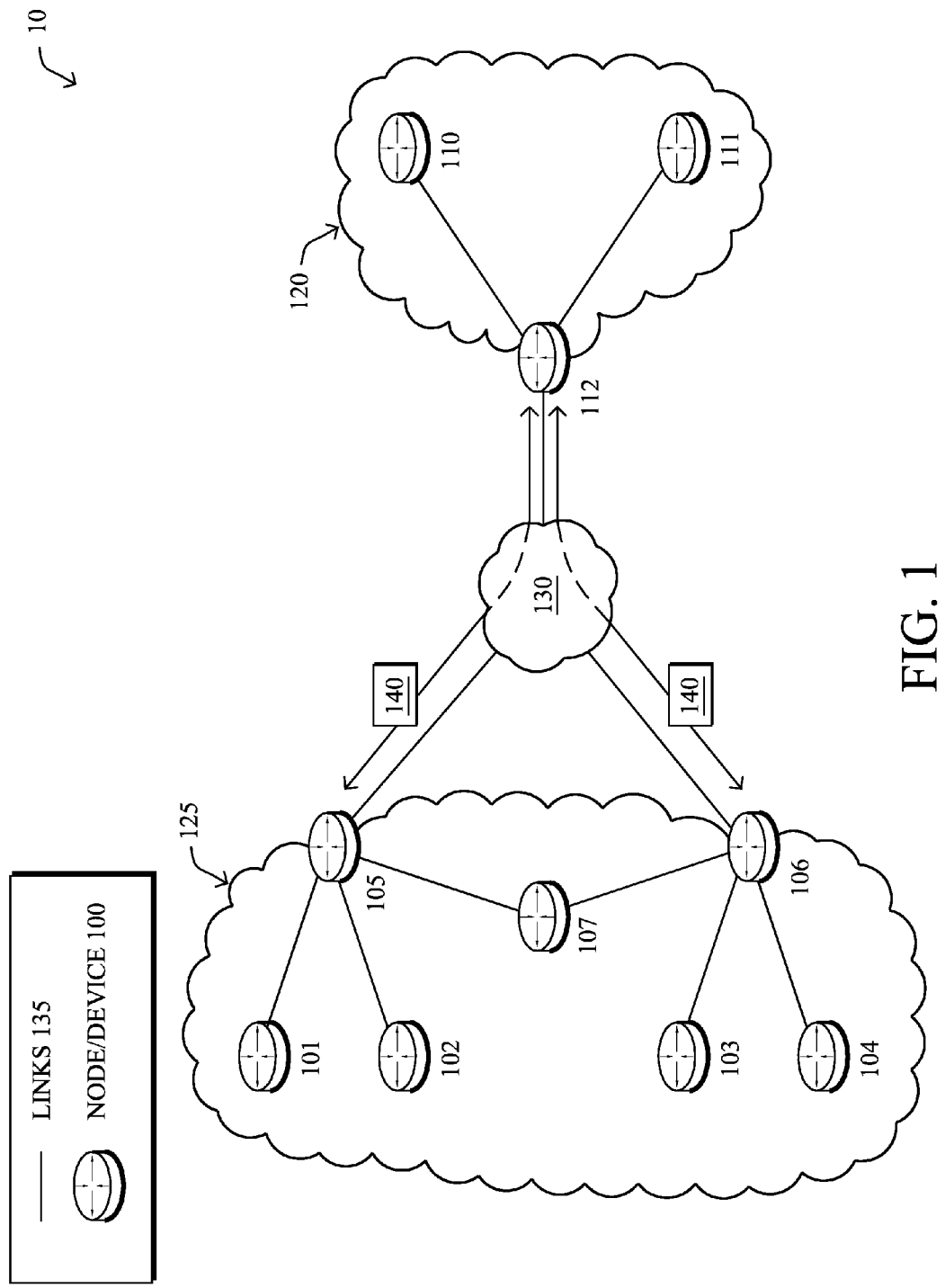
FIG. 1 illustrates an example communication network.

FIG. 1 is a schematic block diagram of an example simplified computer network 10 illustratively comprising autonomous systems (ASs) 120, 125 connected via network 130 (e.g., a WAN, LAN, etc.). Each AS 120, 125 comprises nodes/devices 100 (e.g., labeled as shown, 101-107 in AS 125 and 110-112 in AS 120, and described in FIG. 2 below) interconnected by various methods of communication. For instance, links 135 between nodes/devices 100 may be wired links or shared media (e.g., wireless links) where certain devices 100, such as, e.g., routers, sensors, computers, etc., may be in communication with other devices 100, e.g., based on distance, signal strength, current operational status, location, etc. Other devices 100, such as edge routers 105, 106, and 112, may provide access for particular ASs 120, 125, which may be directly interconnected, or else connected via network 130 as shown.

Those skilled in the art will understand that any number of ASs, nodes/devices, links, etc. may be used in the computer network, and that the view shown herein is for simplicity. Also, those skilled in the art will further understand that while the network is shown in a certain orientation, the network 10 is merely an example illustration that is not meant to limit the disclosure.

Update messages 140 may be exchanged among the edge routers 105, 106, 112 of computer network 10 using predefined network communication protocols such as certain known wired protocols, wireless protocols (e.g., IEEE Std. 802.15.4, WiFi, Bluetooth®, etc.), or other shared-media protocols where appropriate. In this context, a protocol consists of a set of rules defining how the devices interact with each other.

Figure 2:
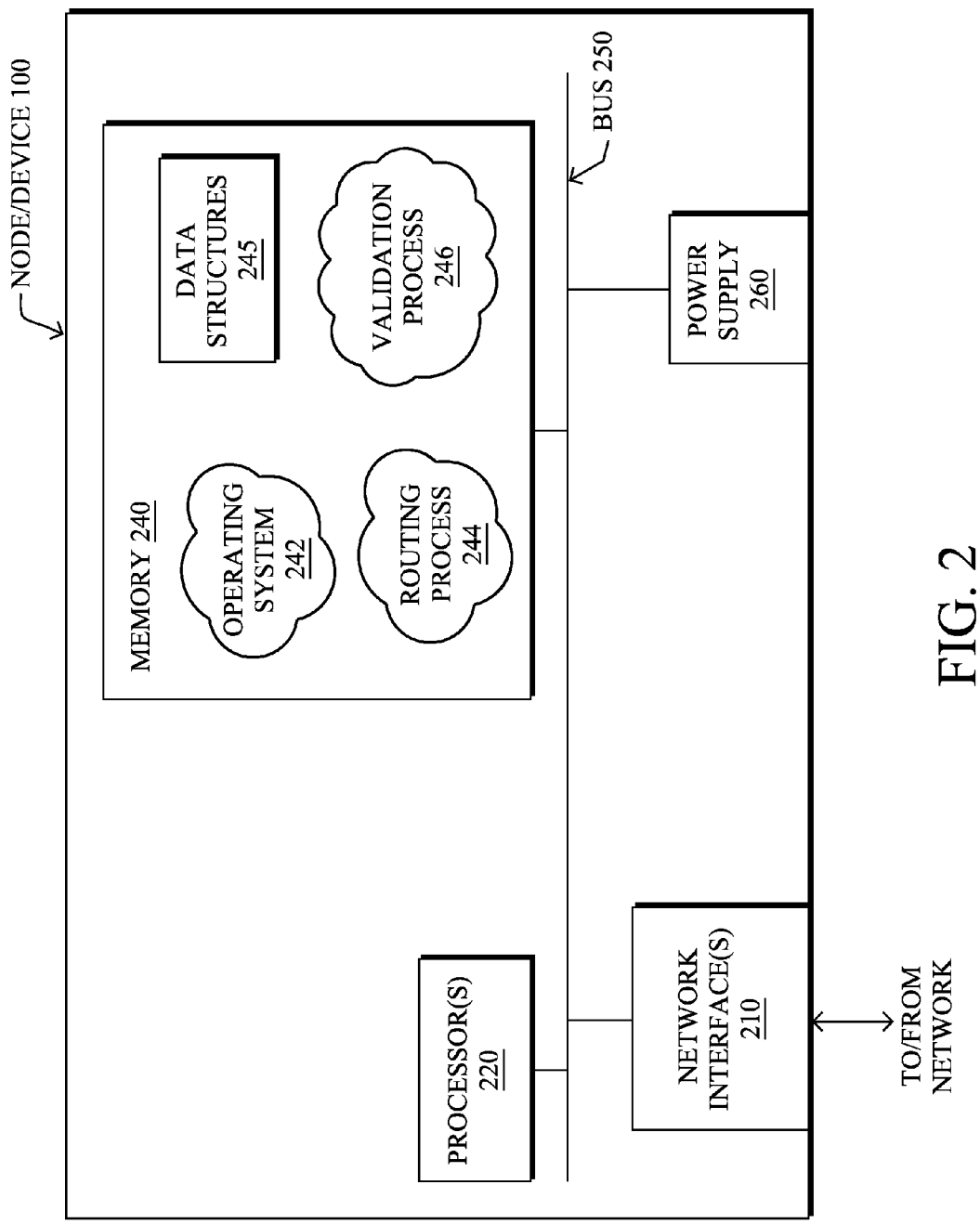
FIG. 2 illustrates an example network device/node.

FIG. 2 is a schematic block diagram of an example node/device 100 that may be used with one or more embodiments described herein. Device 100 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 135 coupled to the network 10. The network interface(s) 210 may be configured to transmit and/or receive data using a variety of different communication protocols. Note, further, that devices 100 may have two different types of network interfaces 210, e.g., wireless and wired/physical connections, and that the view herein is merely for illustration.

Memory 240 comprises a plurality of storage locations that are addressable by the processor 220 and the network interface(s) 210 for storing software programs and data structures 245 associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and a validation process 246, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., via various interior gateway protocols (IGPs), such as link state routing (e.g., Open Shortest Path First (OSPF), or Intermediate-System-to-Intermediate-System (ISIS), etc.) or the Border Gateway Protocol (BGP), such as BGP version 4 or others, as will be understood by those skilled in the art.

In typical systems, such as those shown in FIG. 1, when edge routers 105, 106 receive an update message 140 from a neighboring edge router (e.g., edge router 112), the edge routers 105, 106 perform the prefix origin and path validation on the update message 140, as is well known in the art. An example protocol for performing origin validation on BGP edge routers is specified in Internet Engineering Task Force (IETF) Internet-Draft, draft-ietf-sidr-pfx-validate-03, entitled "BGP Prefix Origin Validation" by Mohapatra, et al. (October 2011). In addition, an example protocol for performing path validation on BGP edge routers is specified in IETF Internet-Draft, draft-ietf-sidr-bgpsec-protocol-03, entitled "BGPSEC Protocol Specification" by Lepinski (May 2012).

Figure 3:
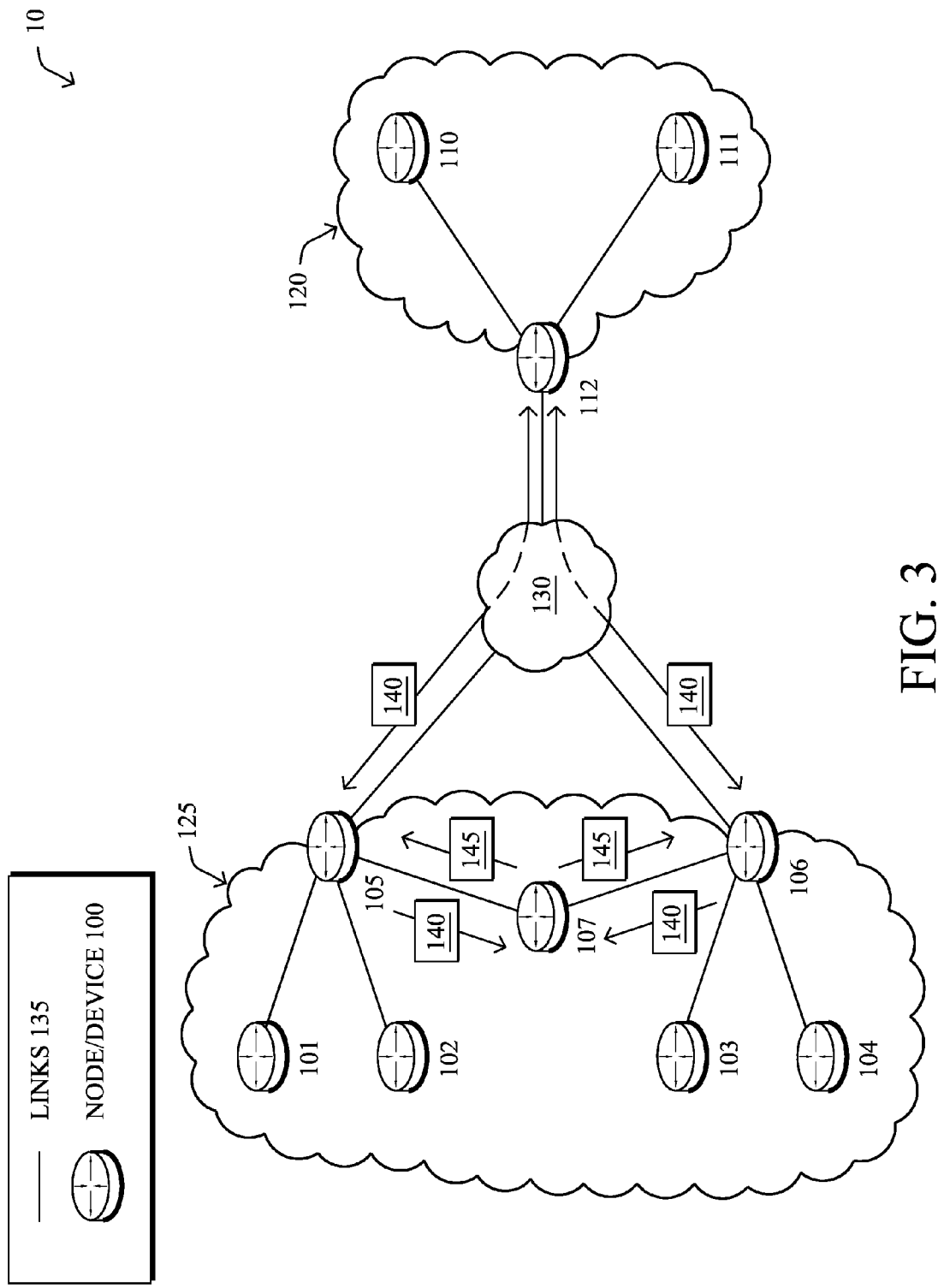
FIG. 3 illustrates the example communication network of FIG. 1 performing typical prefix origin and path validation at an edge router.

Alternatively, as shown in FIG. 3, prefix origin and path validation can be performed on a router reflector (e.g., route reflector 107). By having the route reflectors compute the validation state, edge routers do not have to store memory intensive security related information and avoid intensive computation related to validation. As can be seen in FIG. 3, when edge routers 105, 106 of autonomous system 125 receive an update message 140 from an edge router 112 of a neighboring system (e.g., autonomous system 120), edge routers 105, 106 forward the update message 140 to route reflector 107. Route reflector 107 then performs the prefix origin and path validation on the update message 140 and returns a validation state message 145 to the edge router that received the update message 140. An example protocol for offloading validation from edge routers to route reflectors is specified in IETF Internet-Draft, draft-sriram-bgpsec-design-choices-00, entitled "BGPSEC Design Choices and Summary of Supporting Discussions" by Sriram (July 2011).

However, the mechanisms described above do not allow the route reflectors to announce the validation state to all of its IBGP peers. The techniques described herein provide for prefix origin and path validation on route reflectors and allow: (1) route reflectors to advertise the validation state to all IBGP edge routers; and (2) edge routers to extract the validation state of its announced new paths. These techniques allow route reflectors to perform the validation, compute the validation state, and advertise the validation state back to all of its IBGP clients. Once the validation state has been received by an edge router, the edge routers can then extract the validation states of its paths that were announced to the route reflector.

Specifically, according to one or more embodiments of the disclosure, before validation is done using a route reflector, the route reflector should communicate to its IBGP edge routers its capability to perform BGP validation. Once the edge routers receive this message, they can return a message to the route reflector indicating whether or not the particular edge router is capable of receiving and proper parsing of the validation messages from the route reflector.

For example, a BGP RR Prefix Validation Capability Message can be used by a route reflector to indicate its ability to perform BGP prefix origin and path validation. It can also be used by the edge routers to indicate that the edge routers are capable of receiving and proper parsing of the Reserved Fields of an Origin Validation State Extended Community, such as those described below and in IETF Internet-Draft, draft-ietf-sidr-origin-validation-signaling-01, entitled "BGP Prefix Origin Validation State Extended Community" by Mohapatra et al. (August 2011).

The BGP RR Prefix Validation Capability Message can be defined as follows:
Capability Code: 99
Capability Length: variable
Capability Value: consists of one or more tuples of [AFI, SAFI, Flags]

---

Address Family Identifier (AFI) (16 bits)
Subsequent Address Family Identifier (SAFI) (8 bits)
Flags (8 bits)
. . .

---

In the Capability Values above, the AFI and SAFI are the Address Family Identifier and Subsequent Address Family Identifier for which the route reflector is willing to exchange information about validation capabilities. The Flags for a particular Address Family can be defined as:

| 0 | 1 | 2 | 3 | 4 | 5 | 6 | 7 |
|---|---|---|---|---|---|---|---|
| O | P | | | Reserved | | | |

The Origin Validation Bit (O) and the Path Validation Bit (P) can be used to indicate whether the route reflector/edge router is capable of performing the BGP prefix origin and path validation or not. When set (value, 1), these bits indicate that the route reflector/edge router is going to perform BGP validation at the route reflector. Otherwise (value, 0), these bits in the BGP RR Prefix Validation Capability Message indicate that the route reflector/edge router will explicitly disable BGP prefix origin and/or path validation at their end.

A route reflector/edge router may advertise the BGP RR Prefix Validation Capability Message to indicate its willingness to perform prefix origin and path validation on a route reflector. Any route reflector willing to perform BGP validation must set the appropriate flag bits for a given AFI/SAFI in the capability message. Any edge routers willing to rely on a route reflector for BGP validation must then exchange this capability message with the appropriate flag bits being reset in the capability message.

Once the route reflector and edge routers have exchanged messages confirming the capability for performing prefix origin and path validation and the ability to receive and parse the Reserved Fields of an Origin Validation State Extended Community, the edge routers can use the route reflector for validation. Since a route reflector typically acts as a central route database for its IBGP edge routers, performing BGP prefix origin and path validation on the route reflector helps avoid performing these validations on the edge routers. Furthermore, it also helps avoid storing all the necessary security related state information on the edge routers.

Figure 6:
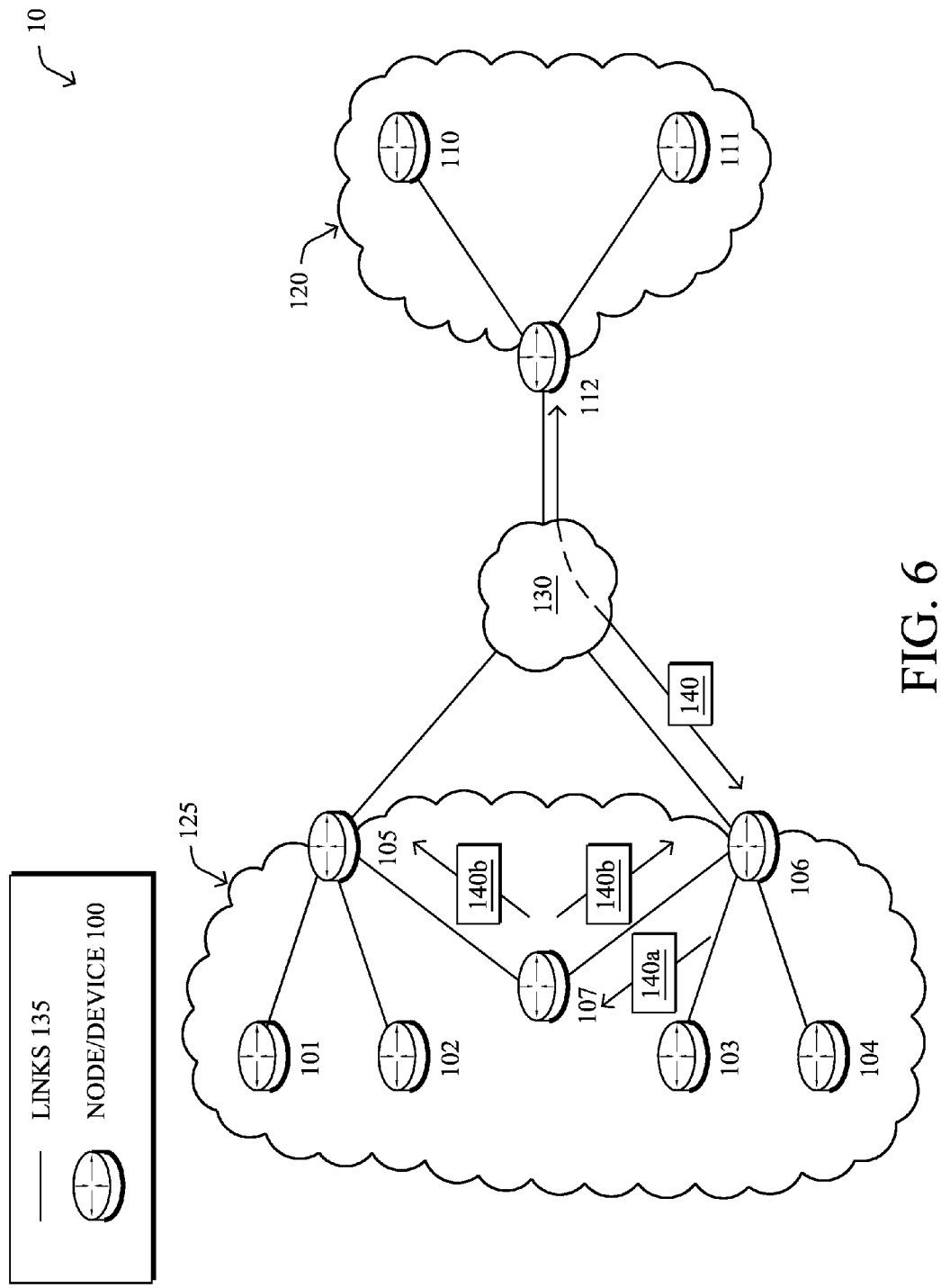
FIG. 6 illustrates the example communication network of FIG. 1 performing offline prefix origin and path validation according to one or more of the techniques described herein.

Referring to the example shown FIG. 6, edge router 106 in system 125 receives an update message 140 through its network interface 210 (see e.g., FIG. 2) from edge router 112 in system 120, notifying edge router 106 about a new path to a device in system 120. Upon receipt, edge router 106 generates a modified Origin Validation State Extended Community through validation process 246 (see e.g., FIG. 2), which it attaches to the update message 140 to create a modified update message 140A. Edge router 106 then sends the modified update message 140A, including the modified Origin Validation State Extended Community, to route reflector 107. An example protocol for Origin Validation State Extended Communities can be found in IETF Internet-Draft, draft-ietf-sidr-origin-validation-signaling-01, entitled "BGP Prefix Origin Validation State Extended Community" by Mohapatra et al. (August 2011), an example of which is shown in FIG. 4. To implement the techniques described herein, the Reserve Fields of the Origin Validation State Extended Community shown in FIG. 4 are extended to carry more information as shown in FIG. 5. In the modified Origin Validation State Extended Community in FIG. 5, the Type and Value can assume the following values:

| Type | Value (4 Octets) |
|---|---|
| 1 | Path ID |
| 2 | Origin AS Number |
| 3 | Router ID |

When route reflector 107 receives modified update message 140A from edge router 106, route reflector 107 performs the prefix origin and path validation using validation process 246 on the new routes announced in modified update message 140A. For example, route reflector 107 can follow the rules defined in Internet Engineering Task Force (IETF) Internet-Draft, draft-ietf-sidr-pfx-validate-03, entitled "BGP Prefix Origin Validation" by Mohapatra, et al. (October 2011) for performing BGP prefix origin validation and those in IETF Internet-Draft, draft-ietf-sidr-bgpsec-protocol-03, entitled "BGPSEC Protocol Specification" by Lepinski (May 2012) for performing BGP path validation. Route reflector 107 should compute and store in memory 240 the appropriate validation state for all BGP paths received from all edge routers (e.g., edge routers 105, 106) that rely on route reflector 107 for prefix origin and/or path validation.

Once route reflector 107 has completed the prefix origin and/or path validation, it uses validation process 246 to update the route's validation state in the last octet of the modified Origin Validation State Extended Community with one of the following values:

| Value | Meaning |
|---|---|
| 0 | Lookup result = "valid" |
| 1 | Lookup result = "not found" |
| 2 | Lookup result = "invalid" |

Once the route's validation state has been updated in the modified Origin Validation State Extended Community, route reflector 107 announces the new route and its validation state to all of its IBGP clients (e.g., edge routers 105 and 106) through a validation message 140B, which includes the modified Origin Validation State Extended Community and the updated validation state. This provides additional information that helps bind the validation state with a router:path and is signaled along with the validation state, which is not currently standardized. This additional information helps the receiving edge router in applying the validation state from one BGP path (typically a route reflector path) to another path (e.g., EBGP paths).

Using the techniques described herein, when announcing the update and validation state back to the edge routers, the route reflector should use the modified Origin Validation State Extended Community to signal the path validation state and additional information needed by the edge routers, if the edge routers are relying on the route reflector to compute its path validation state. In addition, if the route reflector is enabled to exchange additional paths, for example as described in Internet Engineering Task Force (IETF) Internet-Draft, draft-ietf-idr-add-paths-04, entitled "Advertisement of Multiple Paths in BGP" by Walton, et al. (August 2010), and is announcing all its paths to its IBGP clients, then the route reflector should insert the received path-id and it path validation state in the modified Origin Validation State Extended Community and announce it along with the path. The route reflector should also create Origin Validation State Extended Communities of all the other (non-announced) paths for a given prefix and announce them along with the best path whenever a route reflector is not announcing all its paths.

When edge routers 105, 106 receive validation message 140B from route reflector 107, edge routers 105, 106 will use validation process 246 (see e.g., FIG. 2) to parse the modified Origin Validation State Extended Community from validation message 140B and inherit the validation states for the paths announced. Typically with BGP, whenever an edge router receives its own path for a given prefix from its route reflector neighbor, it drops the path due to the match in the ORIGINATOR ID. However, in the techniques described herein, before dropping the path, an edge router relying on the route reflector to perform BGP prefix origin and path validation will parse the received modified Origin Validation State Extended Community based on the TYPE filed, inherit the state on its announced paths and re-evaluate them by re-running BGP bestpath algorithm, such as described in Internet Engineering Task Force (IETF) Request for Comment 4271, entitled "A Border Gateway Protocol 4 (BGP-4)" by Rekhter, et al. (January 2006). In the case where a path validation extended community is received with type 2, Origin AS number, the receiving edge router may use this information to compute the path validation state of all the paths for a given prefix.

Illustratively, the techniques described herein may be performed by hardware, software, and/or firmware, such which may contain computer executable instructions executed by the processor 220 (or independent processor of interfaces 210) to perform functions relating to the techniques described herein, e.g., in conjunction with routing process 244 (and/or validation process 246).

Figure 7:
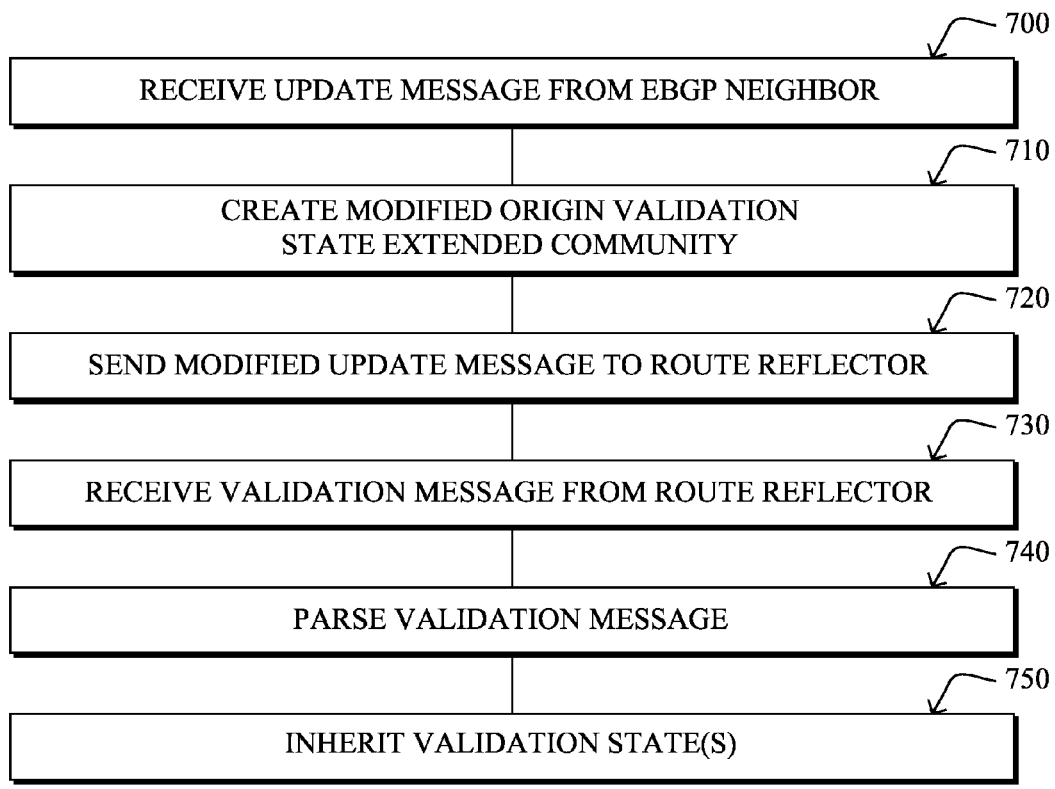
FIG. 7 illustrates an example simplified procedure for performing offline BGP prefix origin and path validation at an edge router.

FIG. 7 illustrates an example simplified procedure for an edge router to perform offline prefix origin and path validation in accordance with one or more embodiments described herein. The procedure may start at Step 700 where an edge router 106 receives and update message 140 from an EBGP neighboring edge router 112, the update message 140 announcing a new path to a device 100 in system 120 of edge router 112. At Step 710, edge router 106 creates a modified Origin Validation State Extended Community, as described in greater detail above, and attaches the modified Origin Validation State Extended Community to the update message 140, creating modified update message 140A, as described in more detail above, which is then sent to the route reflector 107 at Step 720. Once the prefix origin and path validation have been completed by route reflector 107, at Step 730 edge router 106 receives a validation message 140B from route reflector 107, which includes the modified Origin Validation State Extended Community with an updated validationstate field, as described in more detail above. At Step 740, edge router 106 parses the modified Origin Validation State Extended Community from the validation message 140B based on the TYPE filed and inherits the validation state(s) on its announced paths at Step 750, as described in more detail above. At this point, the edge routers 105, 106 may also re-evaluate its announced paths by re-running BGP bestpath algorithm.

Figure 8:
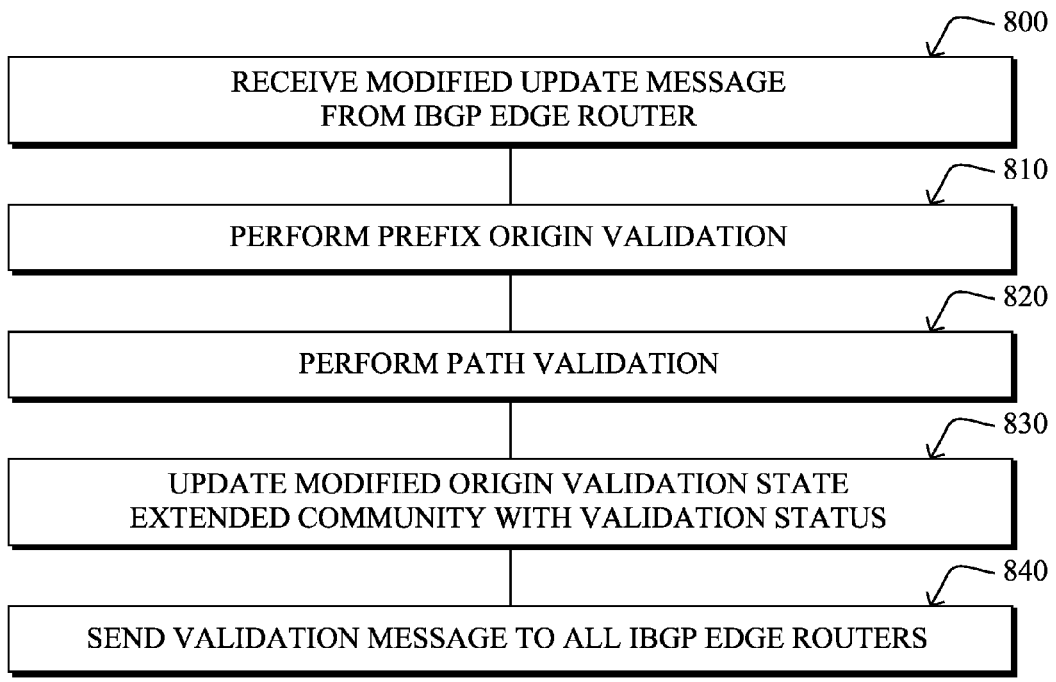
FIG. 8 illustrates an example simplified procedure for performing offline BGP prefix origin and path validation at a route reflector.

FIG. 8 illustrates an example simplified procedure for a route reflector to perform offline prefix origin and path validation in accordance with one or more embodiments described herein. The procedure may start at Step 800 where a route reflector 107 receives a modified update message 140A from an IBGP edge router 106, which includes an attached modified Origin Validation State Extended Community, as described in more detail above. The route reflector 107 performs a prefix origin validation on the prefix(es) listed in the modified update message 140A at Step 810 and a path validation on the path(s) listed in the modified update message 140A at Step 820, using any well known validation processes known in the art. At Step 830, route reflector 107 updates the validation status field of the modified Origin Validation State Extended Community to include the results of the prefix origin and path validations. Route reflector 107 then sends a validation message 140B, including the updated modified Origin Validation State Extended Community, to all IBGP edge routers 105, 106 within its autonomous system 125, at Step 840.

It should be noted that the steps shown are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for offline prefix origin and path validation on route reflectors, it is to be understood that various other adaptations and modifications may be made within the spirit and scope of the embodiments herein. For example, while the illustrative embodiments herein modify an existing Origin Validation State Extended Community, a new attribute could also be defined to carry the same information. In addition, the techniques herein don't need best external or add paths support on edge routers. However the techniques will work when the edge routers are enabled with add paths support or best external. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at an edge router, an update message from a neighboring external border gateway protocol (EBGP) edge router;
creating, by the edge router, a modified origin validation state extended community based on the information in the update message using a processor;
preparing, by the edge router, a modified update message with the processor by attaching the modified origin validation state extended community to the update message;
sending, by the edge router, the modified update message to a route reflector;
receiving, at the edge router, a validation message from the route reflector, wherein the validation message is generated on the route reflector and announced by the route reflector to each edge router capable of receiving validation messages from the route reflector;
parsing the validation message using the processor at the edge router; and
inheriting, at the edge router, a validation state parsed from the validation message.

2. The method of claim 1, further comprising the steps of:
receiving a first prefix validation capability message from the route reflector, the first prefix validation capability message indicating the ability of the route reflector to perform prefix origin and path validation; and
sending a second prefix validation capability message to the route reflector, the second prefix validation capability message indicating the ability to receive and parse the modified origin validation state extended community.

3. The method of claim 2, wherein the first prefix validation capability message comprises an address family identifier, a subsequent address family identifier, and at least one flag related to the address family identifier.

4. The method of claim 1, wherein the modified origin validation state extended community comprises a type field, a value field, and a validation state field.

5. The method of claim 1, wherein parsing the validation message comprises parsing a modified origin validation state extended community in the validation message based on a type field of the modified origin validation state extended community.

6. A method, comprising:
receiving, at a route reflector, a modified update message from an internal border gateway protocol (IBGP) edge router, the modified update message comprising prefix origin and path information;
performing, at the router reflector, a prefix origin validation, using a processor, based on the information contained in the modified update message;
performing, at the route reflector, a path validation, using the processor, based on the information contained in the modified update message;
preparing, at the route reflector, a validation message using the processor, the validation message comprising a validation state related to the prefix origin and path information and based on the prefix origin validation and path validation; and
announcing, by the route reflector, the validation message to each IBGP router peer of the route reflector.

7. The method of claim 6, further comprising:
sending a first prefix validation capability message to the IBGP edge router, the first prefix validation capability message indicating the ability to perform prefix origin and path validation; and
receiving a second prefix validation capability message from the IBGP edge router, the second prefix validation capability message indicating the ability of the IBGP edge router to receive and parse a modified origin validation state extended community.

8. The method of claim 7, wherein the first prefix validation capability message comprises an address family identifier, a subsequent address family identifier, and at least one flag related to the address family identifier.

9. The method of claim 6, wherein the modified update message comprises a modified origin validation state extended community.

10. The method of claim 9, wherein the modified origin validation state extended community comprises a type field, a value field, and a validation state field.

11. The method of claim 6, wherein the validation message comprises an updated modified origin validation state extended community.

12. An apparatus, comprising:
a network interface adapted to communicate over a network;
a processor configured to communicate with the network interface; and
a memory configured to communicate with the processor, the memory having instructions stored thereon that, in response to execution by the processor, cause the processor to perform operations comprising:
receiving a modified update message from an internal border gateway protocol (IBGP) edge router, the modified update message comprising prefix origin and path information;
performing a prefix origin validation based on the information contained in the modified update message;
performing a path validation based on the information contained in the modified update message;
preparing a validation message, the validation message comprising a validation state related to the prefix origin and path information and based on the prefix origin validation and path validation; and
announcing the validation message to each IBGP edge router peer of the route reflector,
wherein the apparatus is a route reflector.

13. The apparatus of claim 12, wherein the instructions, in response to execution by the processor, cause the processor to perform operations further comprising:
sending a first prefix validation capability message to the edge router, the first prefix validation capability message indicating the ability to perform prefix origin and path validation; and
receiving a second prefix validation capability message from the edge router, the second prefix validation capability message indicating the ability of the edge router to receive and parse a modified origin validation state extended community.

14. The apparatus of claim 12, wherein the modified update message comprises a modified origin validation state extended community.

15. The apparatus of claim 14, wherein the modified origin validation state extended community comprises a type field, a value field, and a validation state field.

16. The apparatus of claim 12, wherein the validation message comprises an updated modified origin validation state extended community.

17. An apparatus, comprising:
a network interface adapted to communicate over the network;
a processor configured to communicate with the network interface; and
a memory configured to communicate with the processor, the memory having instructions stored thereon that, in response to execution by the processor, cause the processor to perform operations comprising:
receiving an update message from a neighboring external border gateway protocol (EBGP) edge router;
creating a modified origin validation state extended community based on the information in the update message;
preparing a modified update message by attaching the modified origin validation state extended community to the update message;
sending the modified update message to a route reflector;
receiving a validation message from the route reflector, wherein the validation message is generated on the route reflector and announced by the route reflector to each edge router capable of receiving validation messages from the route reflector;
parsing the validation message at the edge router; and
inheriting, at the edge router, a validation state parsed from the validation message,
wherein the apparatus is an edge router.

18. The apparatus of claim 17, wherein the instructions, in response to execution by the processor, cause the processor to perform operations further comprising:
receiving a first prefix validation capability message from the route reflector, the first prefix validation capability message indicating the ability of the route reflector to perform prefix origin and path validation; and
sending a second prefix validation capability message to the route reflector, the second prefix validation capability message indicating the ability to receive and parse the modified origin validation state extended community.

19. The apparatus of claim 17, wherein the modified origin validation state extended community comprises a type field, a value field, and a validation state field.

20. The apparatus of claim 17, wherein parsing the validation message comprises parsing a modified origin validation state extended community in the validation message based on a type field of the modified origin validation state extended community.

* * * * *